(12) United States Patent
Cmielowski et al.

(10) Patent No.: US 11,676,063 B2
(45) Date of Patent: Jun. 13, 2023

(54) EXPOSING PAYLOAD DATA FROM NON-INTEGRATED MACHINE LEARNING SYSTEMS

(71) Applicant: International Business Machines Corporation, Armonk, NY (US)

(72) Inventors: Lukasz G. Cmielowski, Cracow (PL); Bartlomiej T. Malecki, Slomniki (PL); Rafal Bigaj, Cracow (PL); Maria H. Oleszkiewicz, Smardzowice (PL)

(73) Assignee: International Business Machines Corporation, Armonk, NY (US)

(*) Notice: Subject to any disclaimer, the term of this patent is extended or adjusted under 35 U.S.C. 154(b) by 1112 days.

(21) Appl. No.: 16/367,572

(22) Filed: Mar. 28, 2019

(65) Prior Publication Data
US 2020/0311598 A1    Oct. 1, 2020

(51) Int. Cl.
*G06N 20/00* (2019.01)
*G06F 16/901* (2019.01)
*G06N 3/08* (2023.01)
*G06F 16/00* (2019.01)

(52) U.S. Cl.
CPC .............. *G06N 20/00* (2019.01); *G06F 16/00* (2019.01); *G06F 16/901* (2019.01); *G06N 3/08* (2013.01)

(58) Field of Classification Search
CPC . G06N 20/00; G06N 3/08; G06N 3/10; G06F 16/00; G06F 16/901; G06F 16/951
USPC .......................................................... 706/11
See application file for complete search history.

(56) References Cited

U.S. PATENT DOCUMENTS

| | | | |
|---|---|---|---|
| 10,540,608 B1* | 1/2020 | Dirac ..................... G06N 20/00 |
| 2014/0229407 A1* | 8/2014 | White .................... G06N 20/00 |
| | | | 706/46 |
| 2015/0032838 A1* | 1/2015 | Demsey ............. G06F 16/9574 |
| | | | 709/213 |
| 2015/0278397 A1* | 10/2015 | Hendrickson ......... G06F 16/137 |
| | | | 707/798 |
| 2015/0280959 A1* | 10/2015 | Vincent ............... H04L 67/1097 |
| | | | 709/203 |
| 2016/0261482 A1* | 9/2016 | Mixer ..................... H04L 43/12 |
| 2017/0220949 A1* | 8/2017 | Feng ....................... H04L 41/16 |
| 2018/0063265 A1* | 3/2018 | Crossley ................. G06N 5/02 |
| 2018/0089592 A1* | 3/2018 | Zeiler .................... G06N 20/00 |
| 2018/0114126 A1* | 4/2018 | Das ........................ G06F 16/35 |
| 2018/0322415 A1* | 11/2018 | Bendre ..................... G06F 9/46 |
| 2018/0322417 A1* | 11/2018 | Bendre ................. G06N 20/00 |
| 2018/0349527 A1* | 12/2018 | Li .......................... G06N 3/044 |

(Continued)

FOREIGN PATENT DOCUMENTS

WO    2018218155 A1    11/2018
WO    2018227462 A1    12/2018

*Primary Examiner* — James N Fiorillo
(74) *Attorney, Agent, or Firm* — Eric Chesley; Hunter E. Webb; Keohane & D'Alessandro, PLLC

(57) ABSTRACT

Aspects of the present invention provide an approach for exposing payloads from non-integrated machine learning systems. A generic binding identifier is established to represent a machine learning (ML) system among a set of non-integrated learning systems. A generic subscription identifier is established to represent a deployed model in the ML system. Payload data including a user request, a response, the generic binding identifier, and the generic subscription identifier are received from the ML system and stored in a database for later analysis to identify any issues related to the deployed model.

20 Claims, 4 Drawing Sheets

(56) References Cited

U.S. PATENT DOCUMENTS

| | | | |
|---|---|---|---|
| 2019/0019106 A1* | 1/2019 | Driscoll | G06N 20/00 |
| 2019/0121889 A1* | 4/2019 | Gold | G06F 3/06 |
| 2019/0129436 A1* | 5/2019 | Sun | G06N 3/08 |
| 2019/0138511 A1* | 5/2019 | Margiolas | G06F 16/2272 |
| 2019/0156229 A1* | 5/2019 | Tee | G06N 7/00 |
| 2019/0197396 A1* | 6/2019 | Rajkumar | G06N 3/08 |
| 2019/0333636 A1* | 10/2019 | Bennett | G16H 50/00 |
| 2019/0392866 A1* | 12/2019 | Yoon | G11B 27/28 |
| 2020/0005187 A1* | 1/2020 | Bendre | G06F 40/20 |
| 2020/0012886 A1* | 1/2020 | Walters | G06F 18/2148 |
| 2020/0042920 A1* | 2/2020 | Moorthy | G06Q 10/06315 |
| 2020/0134320 A1* | 4/2020 | Crossley | G06F 9/451 |
| 2020/0160229 A1* | 5/2020 | Atcheson | G06N 20/00 |
| 2020/0184350 A1* | 6/2020 | Bhide | G06N 5/045 |
| 2020/0195652 A1* | 6/2020 | Carnahan | G06F 21/604 |
| 2020/0210966 A1* | 7/2020 | Nuthi | G06N 20/00 |
| 2020/0274894 A1* | 8/2020 | Argoeti | H04L 63/1433 |
| 2020/0293775 A1* | 9/2020 | Bigaj | G06V 10/7788 |
| 2020/0311308 A1* | 10/2020 | Arbuckle | G06F 21/6254 |
| 2020/0311616 A1* | 10/2020 | Rajkumar | G06N 3/008 |
| 2021/0073650 A1* | 3/2021 | Reisser | G06N 3/045 |
| 2021/0241177 A1* | 8/2021 | Wang | G06N 20/00 |
| 2021/0274010 A1* | 9/2021 | Stein | H04L 69/08 |
| 2021/0374812 A1* | 12/2021 | Hoang | G06N 20/00 |
| 2022/0004900 A1* | 1/2022 | Salahuddin | G06F 30/27 |
| 2022/0108185 A1* | 4/2022 | Venugopalan | G06F 30/27 |

* cited by examiner

EXPOSING PAYLOAD DATA FROM NON-INTEGRATED MACHINE LEARNING SYSTEMS

TECHNICAL FIELD

The subject matter of this invention relates generally to machine learning systems. More specifically, aspects of the present invention provide a solution that exposes payload data of machine learning models deployed on non-integrated machine learning systems.

BACKGROUND

"Big data" is a broad term for datasets so large or complex that traditional data processing applications are often inadequate. For example, a social networking system can run several application services that pertain to big data. The term "big data" also often refers to the use of predictive analytics or other methods to extract values from data. For example, analysis of datasets can find new correlations, trends, patterns, categories, etc. Such analyses rely on machine learning (ML) and often consume a large amount of computational resources (e.g., memory capacity, processor capacity, and/or network bandwidth).

A typical machine learning workflow may include building a model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set can respectively include pairs of input datasets and expected output datasets that correspond to the respective input datasets.

Various web-based or mobile applications often rely on machine learning models to process large and complex "big data" to provide application services (e.g., personalized or targeted application services) to a large number of users. Higher accuracy and/or consistency models are sought while the requirements of these models are ever evolving. Experiments involving the evaluation of these models nevertheless take time and are typically the manual burdens of one or more developers or analysts.

SUMMARY

In general, aspects of the present invention provide an approach for exposing payloads from non-integrated machine learning systems. A generic binding identifier is established to represent a machine learning (ML) system among a set of non-integrated learning systems. A generic subscription identifier is established to represent a deployed model in the ML system. Payload data including a user request, a response, the generic binding identifier, and the generic subscription identifier are received from the ML system and stored in a database for later analysis to identify any issues related to the deployed model.

One aspect of the invention provides a computer-implemented method for exposing payloads from non-integrated machine learning systems, comprising: generating a generic binding identifier to represent a machine learning system; generating a generic subscription identifier to represent a deployed model in the machine learning system; receiving, from the machine learning system, a payload generated by the deployed model including a user request, a response, the generic binding identifier, and the generic subscription identifier; and storing, for later analysis related to the deployed model, the payload in a database.

Another aspect of the invention provides a system for exposing payloads from non-integrated machine learning systems, comprising: a memory medium comprising program instructions; a bus coupled to the memory medium; and a processor, for executing the program instructions, coupled to a payload management engine via the bus that when executing the program instructions causes the system to: generate a generic binding identifier to represent a machine learning system among the non-integrated learning systems; generate a generic subscription identifier to represent a deployed model in the machine learning system; receive, from the machine learning system, a payload generated by the deployed model including a user request, a response, the generic binding identifier, and the generic subscription identifier; and store, for later analysis related to the deployed model, the payload in a database.

Yet another aspect of the invention provides a computer program product embodied in a computer readable medium that, when executed by a computer device, performs a method for exposing payloads from non-integrated machine learning systems, the method comprising: generating a generic binding identifier to represent a machine learning system among the non-integrated learning systems; generating a generic subscription identifier to represent a deployed model in the machine learning system; receiving, from the machine learning system, a payload generated by the deployed model including a user request, a response, the generic binding identifier, and the generic subscription identifier; and storing, for later analysis related to the deployed model, the payload in a database.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
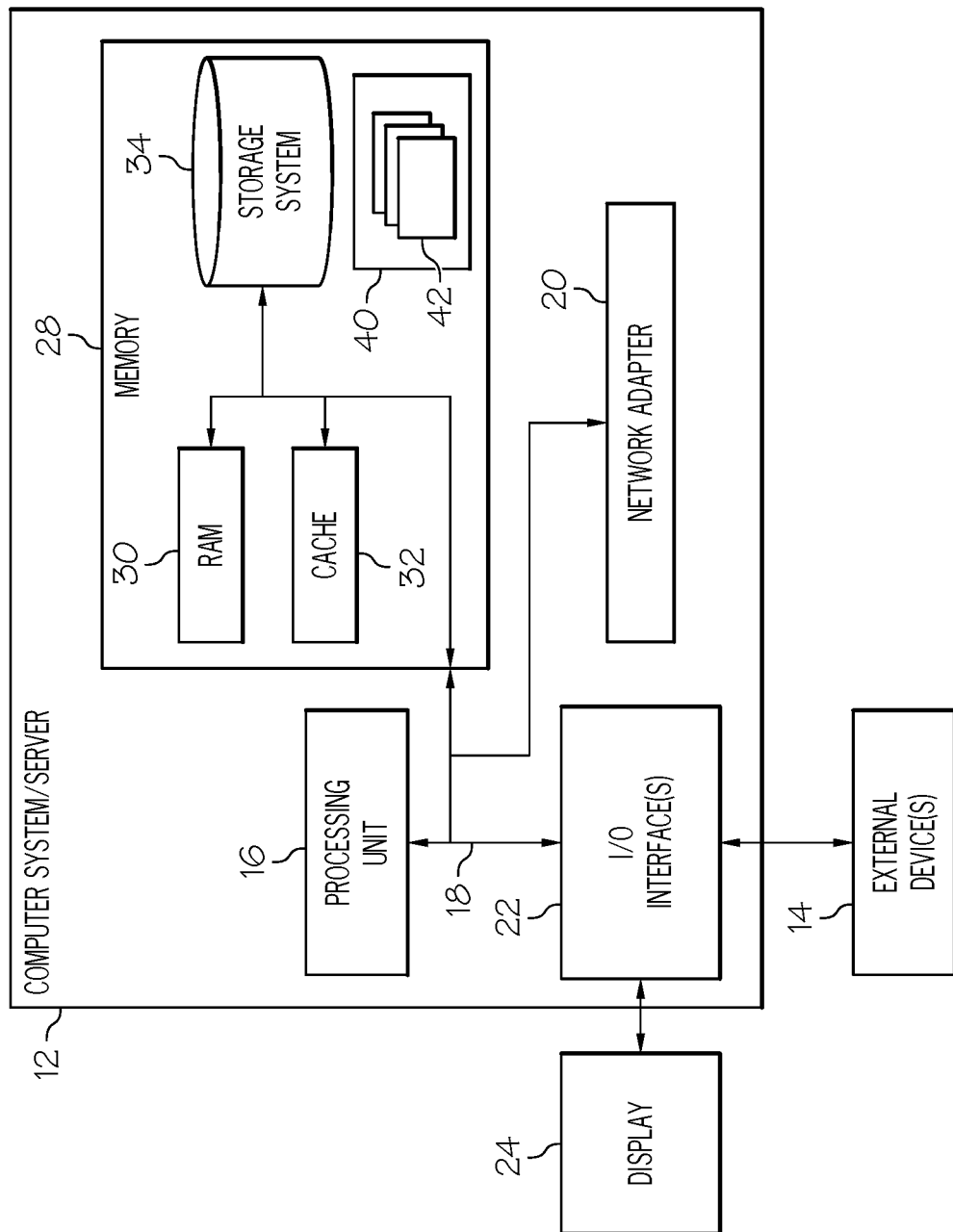
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for exposing payloads from non-integrated machine learning systems. A generic binding identifier is established to represent a machine learning (ML) system among a set of non-integrated learning systems. A generic subscription identifier is established to represent a deployed model in the ML system. Payload data including a user request, a response, the generic binding identifier, and the generic subscription identifier are received from the ML system and stored in a database for later analysis to identify any issues related to the deployed model.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Machine learning is a subfield of artificial intelligence (AI). The goal of machine learning generally is to understand the structure of data and fit that data into models that can be understood and utilized by people. Although machine learning is a field within computer science, it differs from traditional computational approaches. In traditional computing, algorithms are sets of explicitly programmed instructions used by computers to calculate or problem solve. Machine learning algorithms instead allow for computers to train on data inputs and use statistical analysis in order to output values that fall within a specific range. Because of this, machine learning facilitates computers in building models from sample data in order to automate decision-making processes based on data inputs.

Figure 2:
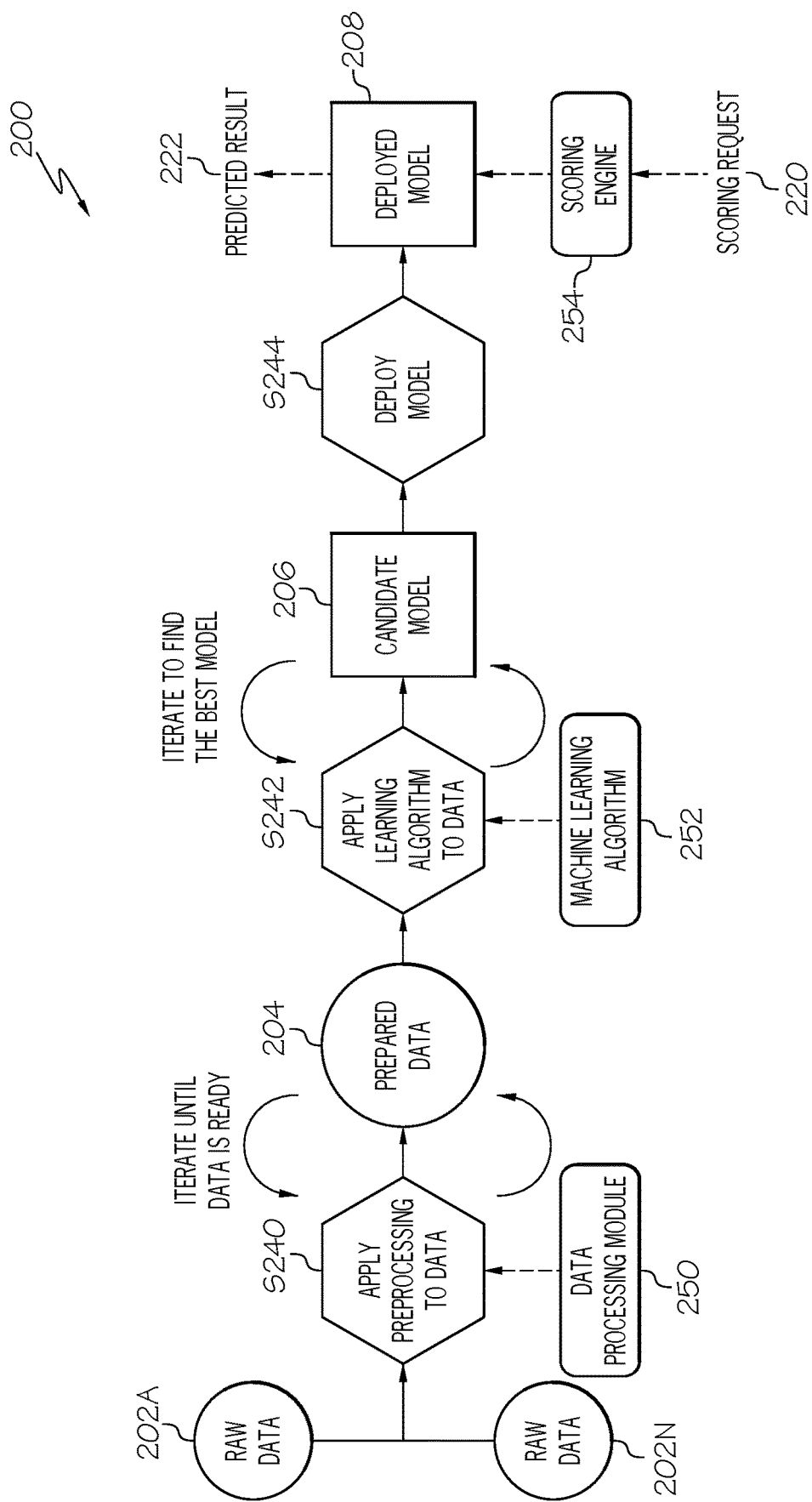
FIG. 2 depicts an example machine learning pipeline according to an embodiment of the present invention.

FIG. 2 depicts an example machine learning pipeline 200 according to an embodiment of the present invention. As shown, at step S240, data preprocessing module 250 can apply any preprocessing to received raw data 202A-N to produce prepared data 204. Preprocessing refers to the transformations applied to raw data before feeding it to an algorithm. Data preprocessing is a technique that is used to convert the raw data into a clean data set. In other words, whenever the data is gathered from different sources it is collected in raw format which may not be feasible for later analysis. An algorithm typically requires data to be in a particular format. For example, an algorithm may not support null values, therefore to execute the algorithm all null values have to be managed from the original raw data set prior to execution. Preprocessing can be iterated until the data is ready.

Once the data is ready, at step S242, machine learning algorithm module 252 applies a machine learning algorithm to prepared data 204 to produce candidate model 206. Raw data 202A-N can be divided into two types. Once candidate model 206 is created, raw data 202A-N can include testing data which is fed into candidate model 206 to see how accurate the model behaves. If the model does not work as expected, then additional training data is provided until the model meets the expected criteria. Once candidate model 206 works as expected, at step S244, it is then deployed to a production environment as deployed model 208 which can be fed real-time data (e.g., scoring request 220) to generate an output (e.g., predicted result 222) using scoring engine 254. In most cases, deployed model 208 continues to learn from the real-time data streamed into it and its accuracy improves.

A machine learning model is the piece of software that may contain the statistical rules, data patterns, algorithms, and learning processes. The model acts like a black box that takes the incoming data and processes it to generate a certain prediction, output, or target value. The model is persisted in memory or disk for reuse and retraining as and when needed. The model needs to be trained with quality data to get quality output. The term generally used in the industry for machine learning data is "dataset". There are many datasets made freely available for others to train their models with or for learning purposes. An algorithm is a sequence of instructions for solving a problem. Machine learning algorithms are typically complex pieces of code with multitudes of scientific and mathematical calculations working together to process data, identify patterns, and extract patterns within the data.

Machine learning (ML) systems typically include a payload logging feature that provides the ability to log all inputs and outputs of a deployed model. Today, in order to be able to use this feature, each machine learning or scoring engine in a machine learning system needs to be integrated with this feature so that all machine learning requests and responses are logged. The issue here is that there are many different scoring engines available and integration with each of them is time consuming and may require many steps be performed by a user. The current embodiments solve these and/or other problems in the current solutions by supporting each machine learning engine without integrating them. The solution is based on simulating the integration of the different scoring engines that mimics actual integration allowing for exposing payload data (e.g., inputs and outputs) of machine learning models deployed on non-integrated machine learning systems.

Figure 3:
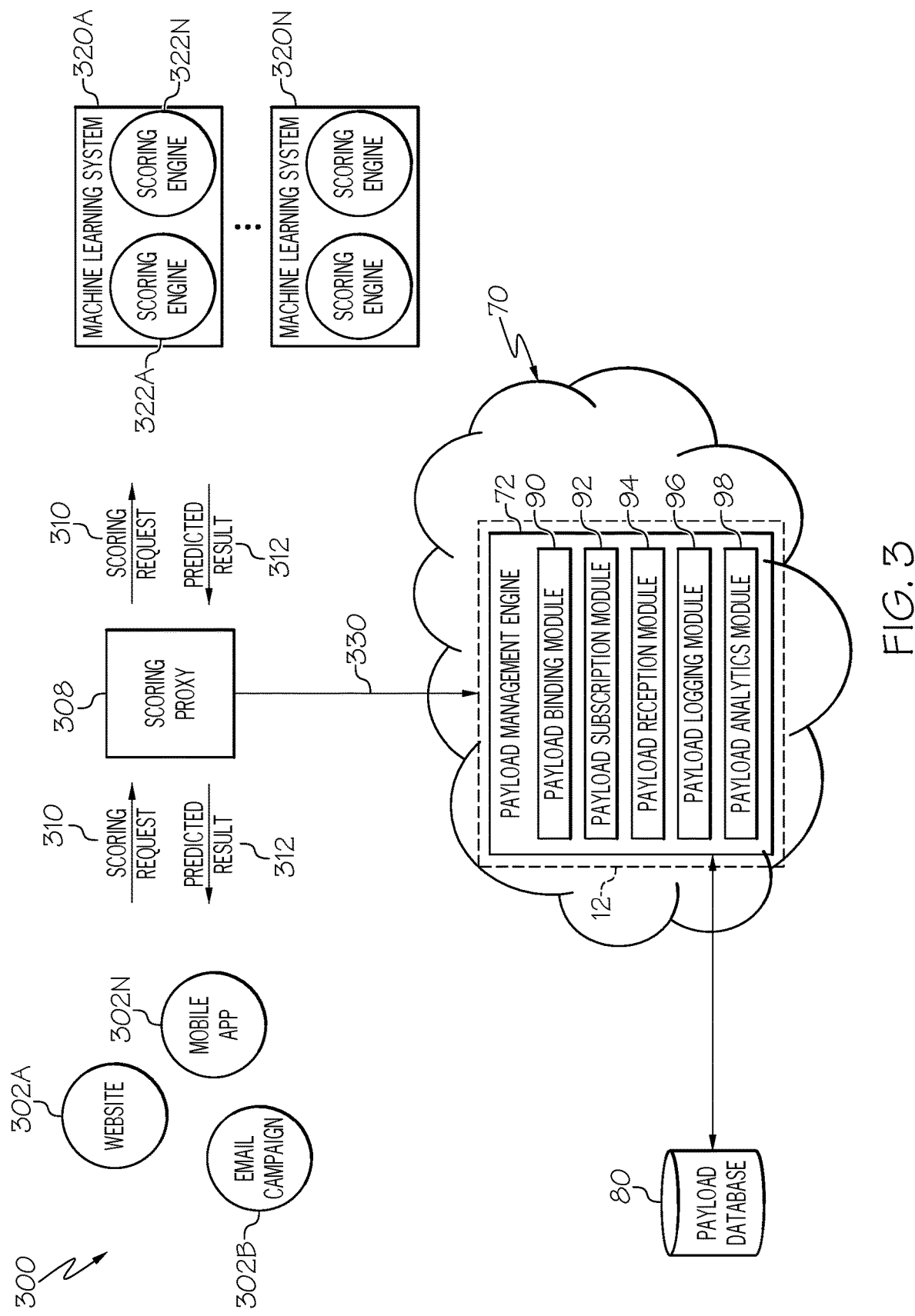
FIG. 3 depicts a system diagram according to an embodiment of the present invention.

Referring now to FIG. 3, a system diagram describing the functionality discussed herein according to an embodiment of the present invention is shown. It is understood that the teachings recited herein may be practiced within any type of networked computing environment 300 (e.g., a cloud computing environment 70). A stand-alone computer system/server 12 is shown in FIG. 3 for illustrative purposes only. In the event the teachings recited herein are practiced in a networked computing environment 300, each client need not have a payload management engine (hereinafter "system 72"). Rather, system 72 could be loaded on a server or server-capable device that communicates (e.g., wirelessly) with client machines to expose payload data of machine learning models deployed on non-integrated machine learning systems therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to payload management of machine learning models deployed on non-integrated machine learning systems in a networked computing environment. Such other system(s) have not been shown in FIG. 3 for brevity purposes.

Along these lines, system 72 may perform multiple functions similar to a general-purpose computer. Specifically, among other functions, system 72 can manage and expose payloads of machine learning models deployed on non-integrated machine learning systems. To accomplish this, system 72 can include: a payload binding module 90, a payload subscription module, 92, a payload reception module 94, a payload logging module 96, and a payload analytics module 98. Although the functionality of system 72 is shown in FIG. 3 as including both a client-side portion and a server-side portion, in some examples, the functions of system 72 can be implemented as a standalone application installed on user device, such as a smartphone, tablet, or the like. In addition, the division of functionalities between the client and server portions of conversational disambiguation can vary in different examples. For instance, in some examples, the client executed on a user device can be a thin client that provides only user-facing input and output processing functions, and delegates all other functionalities of system 72 to a backend server.

Referring again to FIG. 3, payload binding module 90 of system 72, as executed by computer system/server 12, is configured to perform a generic binding process to provide integration between system 72 and an external ML system. This can be done by a user submitting proper credentials via an Application Programming Interface (API) or plugin to allow system 72 access to the ML system. Additionally, the binding provides an association of the ML system with a generic binding identifier. The identifier bound to the ML system is said to reference that system. In an embodiment, the user may provide the identifier of her choice (e.g., a descriptive name) for the ML system which can be used going forward as a reference to an ML system. In another embodiment, the identifier can be automatically assigned during the generic binding process for later reference.

Payload subscription module 92 of system 72, as executed by computer system/server 12, is configured to create a generic subscription that provides a logical connection between system 72 and a deployed model of an external ML system. One or more generic subscriptions are created by the user manually before payload is logged to a data mart. A generic subscription identifier is created that provides an association between system 72 and the particular deployed model. It acts as a handle or reference that is used to group payload for the associated deployed model of an external ML system and monitored by system 72. In an embodiment, a generic subscription including an associated identifier can be manually created by a user via an API or plugin for each deployed model configured to receive a user request.

Once the generic binding and generic subscription processes have taken place, a user can then request a real-time prediction via a synchronous call to an ML system. The prediction is made when the ML system gets the request with a response returned in or near real-time. Real-time predictions are commonly used to enable predictive capabilities within interactive website, mobile, or desktop applications (e.g., applications 302A-N). A user can query an ML system for predictions by using an associated API/plugin. The API/plugin accepts a single input observation in a request payload and returns the prediction synchronously in the response.

In the example shown in FIG. 3, scoring proxy 308 is a proxy server that acts as a gateway between a user and any number of machine learning services. Proxy servers can provide varying levels of functionality, security, and privacy depending on a use case, needs, or company policy. If a user is using a proxy server, internet traffic flows through the proxy server on its way to the address requested. The request then typically comes back through that same proxy server and then the proxy server forwards the data received from the service to the user. As shown, scoring proxy 308 is configured to communicate with machine learning systems 320A-N, as well as system 72. Scoring proxy 308 is only an example of a way payload can be logged for a non-integrated ML engine. It can be useful for certain thin client applications such as mobile app 302N. The same can be achieved without scoring proxy if the user finds it more comfortable to send payload directly from the application that is making predictions with the ML model, like for example a computer system service website 302A.

ML system 320A is shown with scoring engines 322A-N. Each deployed model has its own scoring endpoint directed to a particular scoring engine. However, a single ML service can support multiple runtimes served on different scoring engines, while the ML service is responsible for load balancing. As stated, machine learning is the process of teaching a computer to carry out a task, rather than programming it how to carry that task out step by step. At the end of training, a machine-learning system will be able to make accurate predictions when given data. Those predictions could be answering whether a piece of fruit in a photo is a banana or an apple, if a person is crossing in front of a self-driving car, whether an email is spam, etc.

Payload reception module 94 of system 72, as executed by computer system/server 12, is configured to receive payload data from any number of non-integrated machine learning systems. For example, payload reception module 94 can receive a payload from one or more of ML systems 320A-N. As used herein, a payload is the part of transmitted data that includes the actual intended message. Headers and metadata are sent only to enable payload delivery. In a typical embodiment, the payload would include a user's full prediction or scoring request and the predicted result or score. The payload may be in any format (e.g., CSV, JSON, image file, etc.), now known or later developed, that is established by the particular ML system receiving the request and deriving a response.

Consider an example in which a user transmits scoring request 310 to machine learning system 320A via mobile app 302N. Predicted result 312 is returned to the user. In this example, payload 330 may be in JavaScript Object Notation (JSON) format. JSON is a lightweight data-interchange format that is easy for machines to parse and generate. An example JSON file is shown below:

```
{
    "scoring_id": "d6b62be8-a9b0-4dff-b145-ddf47ca4fd8f",
    "scoring_timestamp": "2019-02-25T18:56:05Z",
    "response_time": 786,
    "binding_id": "c0d57ef1-2bff-4797-9b8e-8ed6e4809670",
    "subscription_id": "f88c8554-b20f-47ac-8834-5664715c2a7f",
    "request": {
        "fields": [
            "name",
            "age",
            "position"
        ],
        "values": [
            [
                "john",
                33,
                "engineer"
            ],
            [
                "mike",
                23,
                "student"
            ]
        ]
    },
    "response": {
        "fields": [
            "name",
            "age",
            "position",
            "prediction",
            "probability"
        ],
        "values": [
            [
                "john",
                33,
                "engineer",
                "personal",
                [
                    0.6744664422398081,
                    0.32553355776019194
```

```
            ]
        ],
        [
            "mike",
            23,
            "student",
            "camping",
            [
                0.2794765664946941,
                0.7205234335053059
            ]
        ]
    ]
  }
}
```

As shown, payload 330 (i.e., the JSON file) includes two returned scoring values for each of two persons (i.e., John and Mike). Payload 330 also includes a binding_id and subscription_id which allows for grouping payload for the associated deployed model. Analytics can then be performed on the deployed model because all payload related to the model has been grouped and logged accordingly.

Payload logging module 96 of system 72, as executed by computer system/server 12, is configured to log a payload in a database or data mart. For example, payload logging module 96 can receive payload 330 and log in payload database 80. As stated, logged payload 330 typically contains a full request and response body of a user request. Additionally, payload 330 can contain additional attributes related to a user request, such as a timestamp of the request, request transaction identifier (ID), request processing time, and/or the like. Payload database 80 can use any type of database structure (e.g., relational, hierarchical, etc.) to store payload 330 (e.g., request, response body, etc.). A transformation and/or conversion process, such as an Extract Transform Load (ETL) process, may need to be performed on payload 330 prior to logging/storing payload 330 into payload database 80. In computing, extract, transform, load (ETL) is the general procedure of copying data from one or more sources into a destination system which represents the data differently from the source(s).

The solution described herein is based on simulating payload logging integration by generic binding and generic subscription processes that mimic actual integration. In an embodiment, payload data is collected for each deployed model including a generic binding identifier and generic subscription identifier for each user request for later reference. The generic binding identifier is used to represent a particular ML system, while the generic subscription identifier represents a particular deployed model in the ML system. By grouping and logging scoring requests and prediction results related to each ML system/deployed model combination, analytics can be performed on the collected data to identify any features (e.g., any issues) related to a particular deployed model without actually integrating the different ML systems.

Payload analytics module 98 of system 72, as executed by computer system/server 12, is configured to provide analytics for a deployed model. By logging the payload for each scoring request, a user is able to access the data and use it for analytics and audit purposes to help identify any machine learning model issues. Payload data analytics is a broad topic and includes, for example, fairness monitoring that allows for bias detection in a deployed model based on the scoring results stored with payload. Bias in a machine learning model is about the model making predictions which tend to place certain privileged groups at a systematic advantage and certain unprivileged groups at a systematic disadvantage. A typical reason for unwanted bias is the presence of biases in the training data. Once identified, bias in a deployed model can be corrected through additional training to provide more accurate results for requests.

In addition, data can change over time which can result in poor and degrading predictive performance in predictive models that assume a static relationship between input and output variables. This problem of the changing underlying relationships in the data is called "concept drift". Concept drift causes problems because predictions become less accurate over time. Machine learning models are usually static models created from historical data and the resulting model prediction reliability decreases over time. Many factors drive this change, such as changing customer behaviors or change driven by normal economic cycles. Concept drift also results from inadequate data sets being used to create the machine learning model. If a long-term trend is not reflected in a training data set, then the deployed model may not predict true customer behavior over time.

A data distribution comparison, with trend and drift detection, can also be used to verify model healthiness. In addition, for audit purposes, a user can provide a full history of the machine learning model predictions which have influenced a business decision (e.g., a load process approval). The ability to store the input data with scoring results is crucial and gives the user the ability to provide more sophisticated explanations of the selected scoring transactions.

Payload analytics module 98 of system 72, as executed by computer system/server 12, can further be configured to notify a user of any features (e.g., any issues) found using the analytics. For example, if concept drift is found to be affecting a particular deployed model, the user can be notified of the issue (e.g., via text message, pop-up box on an interface, etc.) so that the issue can be remedied.

The issues described above and other ML issues illustrate a weakness of most machine learning models because they are not adaptable to change. As change in the input data occurs, the model's decisions and predictions accumulate larger error, which can be very detrimental for applications in business, safety, healthcare, etc. To maintain accuracy the model must be monitored and updated to ensure accurate responses to requests. By logging payload of the different non-integrated systems using the methods described herein, a user is provided the analytical tools necessary to verify the health of each deployed model among the non-integrated ML systems.

Figure 4:
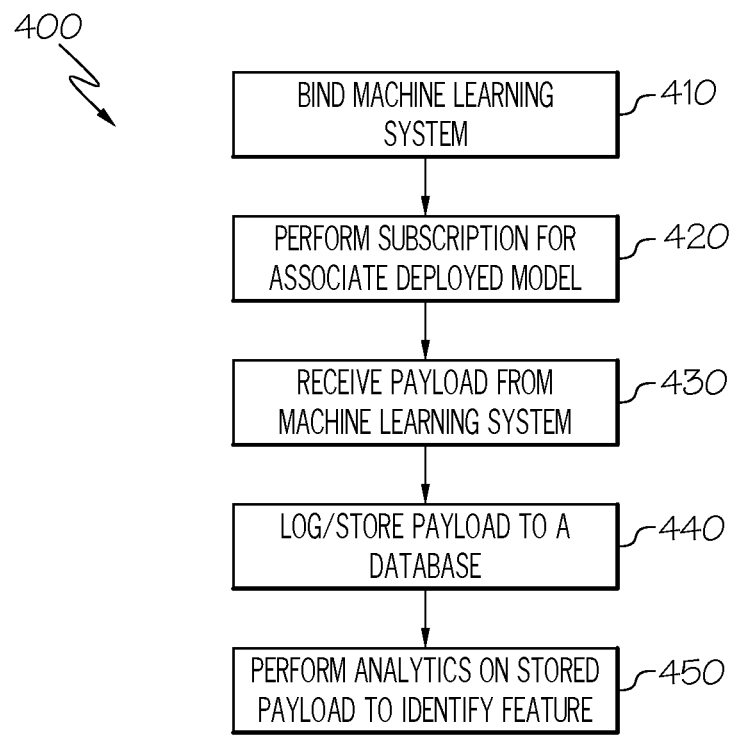
FIG. 4 depicts an example process flowchart according to an embodiment of the present invention.

Referring now to FIG. 4 in conjunction with FIG. 3, a process flowchart 400 according to an embodiment of the present invention is shown. At 410, payload binding module 90 of system 72, as executed by computer system/server 12, performs a generic binding process to provide integration between system 72 and an external ML system. The binding provides an association of the ML system with a generic binding identifier. At 420, payload subscription module 92 of system 72, as executed by computer system/server 12, creates a generic subscription that provides a logical connection between system 72 and a deployed model of an external ML system. A generic subscription identifier is created that provides an association between system 72 and the particular deployed model. Payload reception module 94 of system 72, as executed by computer system/server 12, receives payload data from any number of non-integrated machine learning systems, at 430. The payload includes a user's full prediction or scoring request, a predicted result or score, the generic binding identifier, and the generic subscription identifier. At 440, payload logging module 96 of system 72, as executed by computer system/server 12, is configured to log a payload in a database or data mart. Finally, at 450, payload analytics module 98 of system 72, as executed by computer system/server 12, provides analytics for a deployed model based on the stored payload data.

The process flowchart of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for exposing payloads from non-integrated machine learning systems, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for exposing payloads from non-integrated machine learning systems. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for exposing payloads from non-integrated machine learning systems. In this case, a computer infrastructure, such as computer system 12 (FIG. 1), can be provided and one or more systems for performing the processes of the invention can be captured (e.g., created, purchased, used, modified, etc.) and deployed to the computer infrastructure. To this extent, the deployment of a system can comprise one or more of: (1) installing program code on a computing device, such as computer system 12 (FIG.1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for exposing payloads from non-integrated machine learning systems. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for exposing payloads from non-integrated machine learning systems, comprising:

generating a generic binding identifier that is a unique identifier used to reference the machine learning system and that provides a simulated integration between a machine learning system and an external machine learning system to represent the machine learning system among the non-integrated learning systems;

generating a generic subscription identifier that is a unique identifier used to represent a deployed model in the machine learning system;

receiving, from the machine learning system, a payload generated by the deployed model including a user request, a response, the generic binding identifier, and the generic subscription identifier; and storing, for later analysis related to the deployed model, the payload generated by the deployed model by logging the payload using a non-integrated payload logging feature in a database identified based on the generic subscription identifier, wherein the non-integrated payload logging feature is part of a scoring engine.

2. The computer-implemented method of claim 1, further comprising performing analytics on the stored payload to identify a feature related the deployed model.

3. The computer-implemented method of claim 2, wherein the feature includes an issue affecting an accuracy of the deployed model.

4. The computer-implemented method of claim 1, wherein the payload further includes a timestamp related to the user request, a request transaction identifier, and a response time.

5. The computer-implemented method of claim 1, wherein the scoring engine is one of a plurality of scoring engines in the machine learning system.

6. The computer-implemented method of claim 1, further comprising converting the received payload into a uniform format prior to storing the payload in the database.

7. The computer-implemented method of claim 1, wherein the generic binding identifier is provided by a user.

8. A system for exposing payloads from non-integrated machine learning systems, comprising:
- a memory medium comprising program instructions;
- a bus coupled to the memory medium; and
- a processor, for executing the program instructions, coupled to a payload management engine via the bus that when executing the program instructions causes the system to:
- generate a generic binding identifier that is a unique identifier used to reference the machine learning system and that provides a simulated integration between a machine learning system and an external machine learning system to represent the machine learning system among the non-integrated learning systems;
- generate a generic subscription identifier that is a unique identifier used to represent a deployed model in the machine learning system;
- receive, from the machine learning system, a payload generated by the deployed model including a user request, a response, the generic binding identifier, and the generic subscription identifier; and
- store, for later analysis related to the deployed model, the payload generated by the deployed model by logging the payload using a non-integrated payload logging feature in a database identified based on the generic subscription identifier, wherein the non-integrated payload logging feature is part of a scoring engine.

9. The system of claim 8, the instructions further causing the system to perform analytics on the stored payload to identify a feature related the deployed model.

10. The system of claim 9, wherein the feature includes an issue affecting an accuracy of the deployed model.

11. The system of claim 9, the instructions further causing the system to notify a user of the identified feature.

12. The system of claim 8, wherein the payload further includes a timestamp related to the user request, a request transaction identifier, and a response time.

13. The system of claim 8, the instructions further causing the system to convert the received payload into a uniform format prior to storing the payload in the database.

14. The system of claim 8, wherein the generic binding identifier is provided by a user.

15. A computer program product embodied in a computer readable medium that, when executed by a computer device, performs a method for exposing payloads from non-integrated machine learning systems, the method comprising:
- generating a generic binding identifier that is a unique identifier used to reference the machine learning system and that provides a simulated integration between a machine learning system and an external machine learning system to represent the machine learning system among the non-integrated learning systems;
- generating a generic subscription identifier that is a unique identifier used to represent a deployed model in the machine learning system;
- receiving, from the machine learning system, a payload generated by the deployed model including a user request, a response, the generic binding identifier, and the generic subscription identifier; and
- storing, for later analysis related to the deployed model, the payload generated by the deployed model by logging the payload using a non-integrated payload logging feature in a database identified based on the generic subscription identifier, wherein the non-integrated payload logging feature is part of a scoring engine.

16. The program product of claim 15, the method further comprising performing analytics on the stored payload to identify a feature related the deployed model.

17. The program product of claim 16, wherein the feature includes an issue affecting an accuracy of the deployed model.

18. The program product of claim 16, the method further comprising notifying a user of the identified feature.

19. The program product of claim 15, wherein the payload further includes a timestamp related to the user request, a request transaction identifier, and a response time.

20. The program product of claim 15, the method further comprising converting the received payload into a uniform format prior to storing the payload in the database.

* * * * *